United States Patent [19]

Pretorius et al.

[11] Patent Number: 5,663,705

[45] Date of Patent: Sep. 2, 1997

[54] VEHICLE SAFETY DEVICE

[76] Inventors: Gerhard W. Pretorius, P.O. Box 12138 Leraatsfontein, Witbank 1038; Izak Johannes Daniel Van Der Westhuizen, Malan Street, Schoemansville, Hartsbeespoort 0216, both of South Africa

[21] Appl. No.: 528,259

[22] Filed: Sep. 14, 1995

[51] Int. Cl.$^6$ ...................................................... B60Q 1/00
[52] U.S. Cl. ............... 340/435; 340/457.2; 340/468; 340/469; 340/470; 307/10.8; 362/83.3
[58] Field of Search .................... 340/435, 469, 340/470, 471, 472, 468, 457.2, 473; 307/10.8; 362/83.3

[56] References Cited

U.S. PATENT DOCUMENTS

| | | | |
|---|---|---|---|
| 5,119,067 | 6/1992 | Adell | 340/471 |
| 5,237,306 | 8/1993 | Adell | 340/471 |
| 5,347,261 | 9/1994 | Adell | 340/471 |
| 5,473,306 | 12/1995 | Adell | 340/469 |

FOREIGN PATENT DOCUMENTS

| | | |
|---|---|---|
| 1066028 | 11/1992 | China . |
| 9310550 | 5/1993 | WIPO . |

*Primary Examiner*—Jeffery Hofsass
*Assistant Examiner*—Daniel J. Wu
*Attorney, Agent, or Firm*—Albert O. Cota

[57] ABSTRACT

A vehicle safety device (10) consisting of a warning lamp such as the rear lamps (32) of a vehicle (30), a rearward facing light detector (12) that detects a vehicle approaching from the rear, and an activator (16) for turning on the rear lamps (32). The lamps (32) remain activated for a predetermined period when the presence of an approaching vehicle is detected by the light detector (12).

14 Claims, 2 Drawing Sheets

VEHICLE SAFETY DEVICE

TECHNICAL FIELD

The invention relates in general to vehicle safety devices and more particularly, to a vehicle safety device which warns other motorists of the presence of the vehicle.

BACKGROUND ART

Many motor vehicle collisions which occur at night are the result of poor visibility in which motorists fail to see other vehicles on the road. In particular, at night time, a motorist may often fail to see the rear lamps of a vehicle travelling in front and subsequently collide with the rear of the vehicle.

This problem is exacerbated when the preceding vehicle is a truck, as truck lights are often dull, covered with a layer of dust or mud, or positioned higher on the vehicle than other motorists may expect.

Australian patent number 59797/90 discloses a safety device for minimizing accidents involving moving and parked vehicles. The application discloses a photodetector which is rearwardly mounted on a parked motor vehicle. The parked motor vehicle is enabled by means of the photodetector, to detect the headlamps of other motor vehicles approaching the parked vehicle from the rear. Upon detecting the headlamps of an approaching motor vehicle, the photodetector is activated and causes an electrical circuit to switch on the parking lights of the parked vehicle. The parking lights of the parked vehicle remain switched on for as long as the light from the headlamps continue to impinge on the photodetector.

As far as the applicant is aware, there does not exist any safety device for indicating the presence of moving vehicle on a road to an approaching motorists.

DISCLOSURE OF THE INVENTION

In accordance with this invention there is provided a safety device for a motor vehicle, comprising, at least one warning lamp mountable on the vehicle, a detector located on the vehicle for detecting the presence of an approaching vehicle; and activating means for activating the warning lamp for a predetermined period of time when the presence of an approaching vehicle is detected by the detector.

Further features of the invention provide for the warning lamp to flash at a predetermined frequency during the activation period, for the detector to be a light detector for detecting light from the headlamps of the approaching vehicle, for the light detector to be a light-dependent resistor, for the detector to be rearwardly located on the vehicle to detect other vehicles approaching from the rear, and for power to be supplied to the detector and to the activating means when the headlamps of the vehicle are switched on.

Still further features of the invention provide for the safety device to include interlocking means for preventing reactivation of the warning lamp when light is continuously present at the light detector for a period exceeding the activation period of the warning lamp, and for the warning lamp to be reactivatable only after the light is no longer present at the detector. Preferably, the warning lamp is a hazard lamp on the vehicle. Additionally, the safety device includes annunciator means in the interior of the vehicle to warn occupants of the vehicle of the presence of the approaching vehicle, where the annunciator means is preferably a visible annunciator means.

In view of the above it is the primary object of the invention to provide a safety device for a vehicle which will, at least partially, alleviate the above mentioned difficulties.

These and other objects and advantages of the present invention will become apparent from the subsequent detailed description of the preferred embodiment and the appended claims taken in conjunction with the accompanying drawings.

BEST MODE FOR CARRYING OUT THE INVENTION

The best mode for carrying out the invention is presented in terms of a preferred embodiment that warns the driver of an approaching vehicle of another vehicle, that is in the path of the approaching vehicle.

Figure 1:
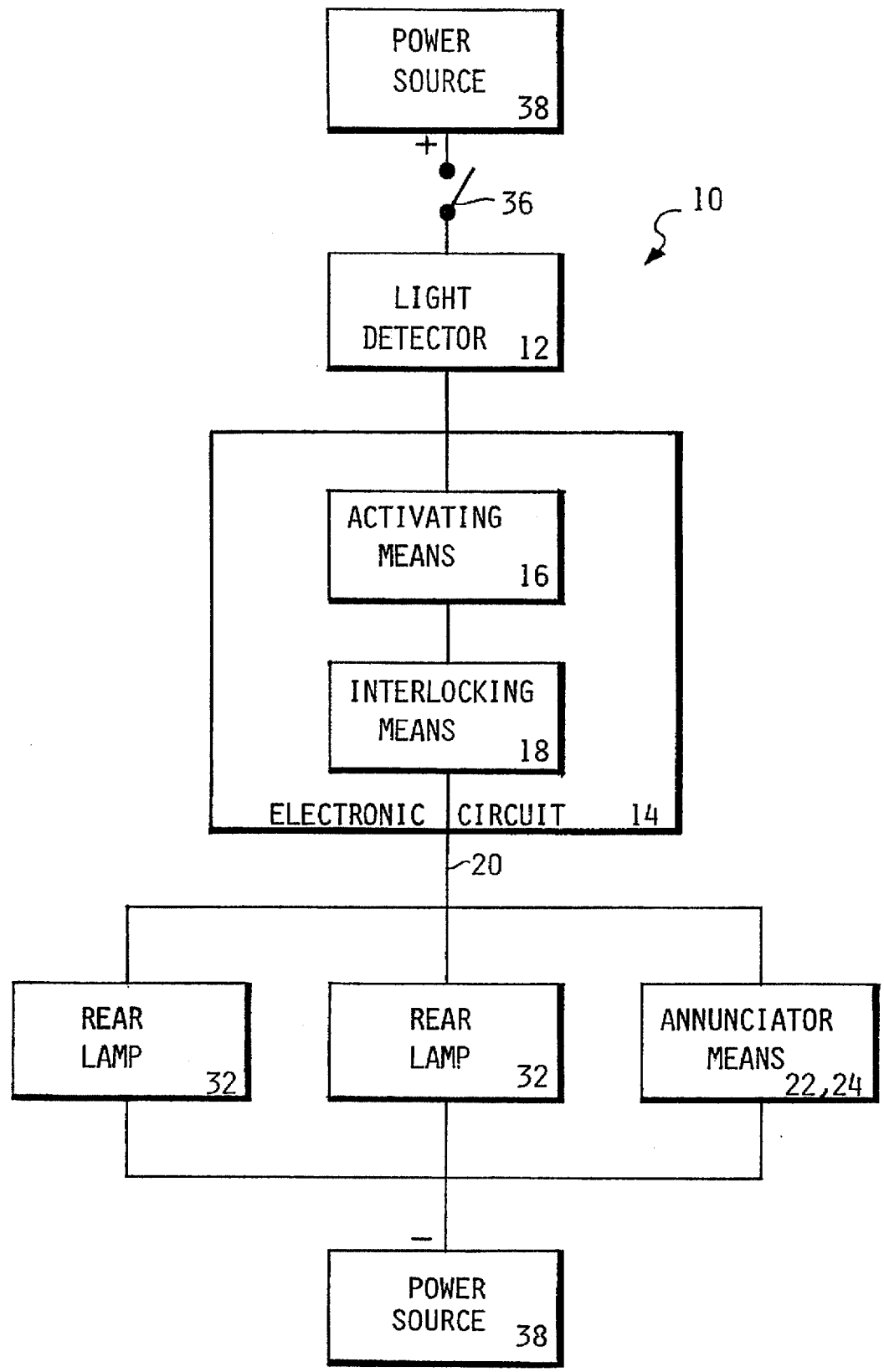
FIG. 1 is a functional block diagram of the safety device according to the invention.
Figure 2:
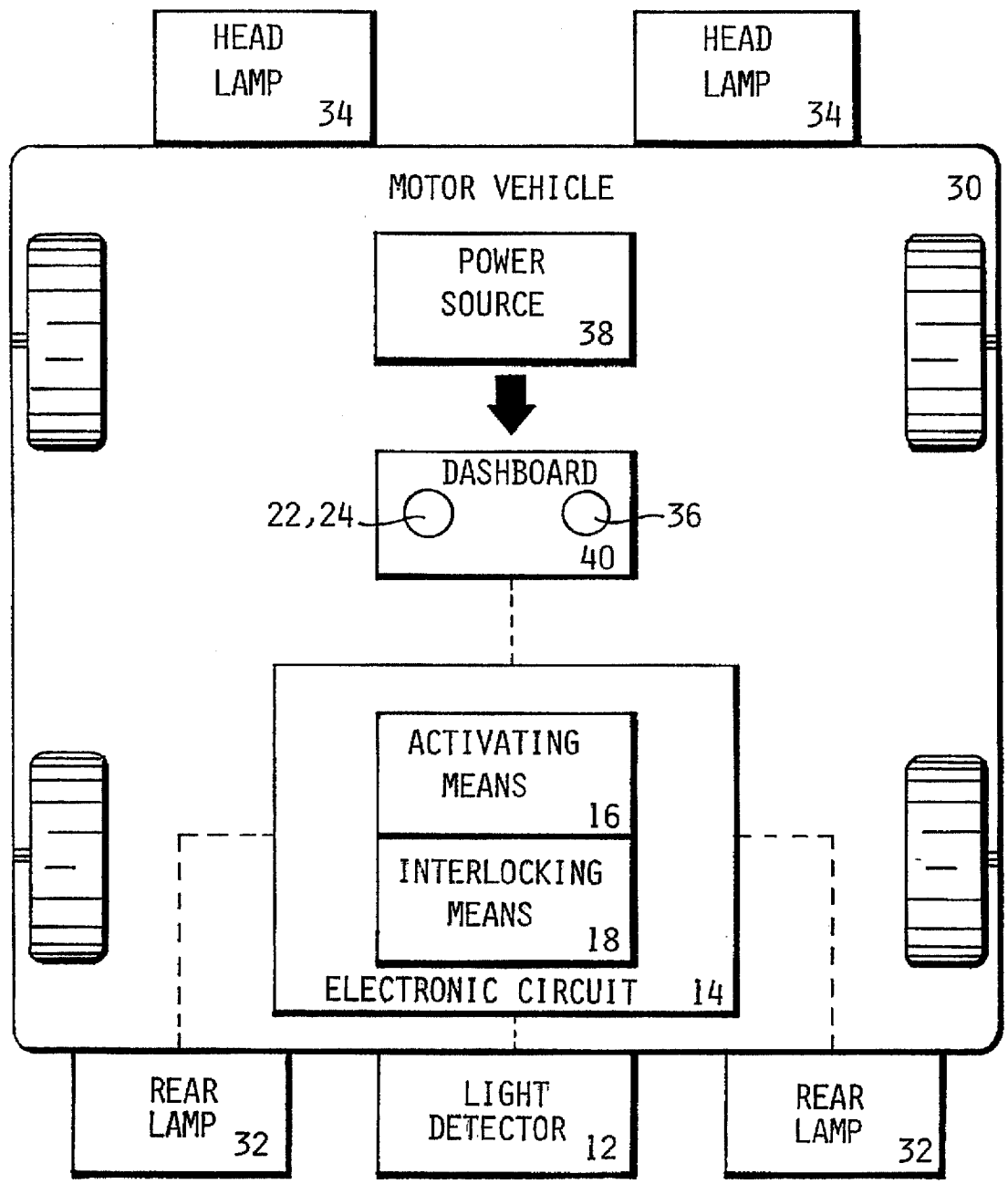
FIG. 2 is a sectional plan view of the safety device of FIG. 1 shown in conjunction with a motor vehicle.

The preferred embodiment of the vehicle safety device 10 as shown in FIGS. 1 and 2, is comprised of six major elements: a light detector 12, an electronic circuit 14, an activating means 16, and interlocking means 18, a device output 20 and an annunciator means 22. The inventive elements operate in combination with a motor vehicle 30 having a pair of rear lamps 32, a pair of headlamps 34 and a headlamp switch 36.

Referring to FIGS. 1 and 2, in which like features are indicated by like numbers. The safety device 10 consists of the light detector 12 and the electronic circuit 14 which includes the activating means 16 and the interlocking means 18. The output 20 from the electronic circuit 14 is connected to at least one warning lamp which preferably consists of the pair of rear lamps 32 on the motor vehicle 30, as well as to the annunciator means 22 which preferably consists of a visible annunciator means such as an indicator lamp 24, located on the dashboard 40 in the interior of the vehicle 30. The light detector 12 is preferably a light-dependent resistor which is well known in the art and therefore, not described. The light detector 12 is rearwardly mounted on the motor vehicle 30 to detect a light source behind the motor vehicle 30.

The power source 38 for the safety device 10, which preferably consists of the vehicle battery is applied to the safety device 10 through the headlamp switch 36 of the vehicle 30. The control of the power source by the switch 36 ensures that the safety device 10 is only operable when the headlamps 34 of the vehicle 30 are switched on by the headlamp switch 36.

Light impinging on the light detector 12 will cause the output of the electronic circuit 14 to activate the flasher unit (not shown) of the motor vehicle 30 for a predetermined period of time. The flasher unit in turn, causes the rear lamps 32 of the motor vehicle 30, and the indicator lamp 24 to flash during the activation period.

The safety device 10 is primarily designed to be operable at night time or when visibility is otherwise poor and when the headlamps 34 of the motor vehicle 30 are in use. Light from the headlamps of other motor vehicles approaching the motor vehicle 30 will cause the rear lamps 32, which may consist of the vehicle hazard lights, to flash in the manner described above. The flashing lights provide a warning signal which can be easily seen by the rearwardly approaching motorists alerting them to the presence of the motor vehicle 30 travelling on the road.

It will be obvious to those skilled in the art, that when the motor vehicle 30 is continuously followed by another vehicle, the light detector 12 will immediately reactivate the rear lamps 32 for further periods upon the expiration of the activation period. To overcome this disadvantage, the interlocking means 18 prevents reactivation of the rear lamps 32 when light is continuously present at the light detector 12 for a period exceeding the activation period. The interlocking means 18 only enables reactivation of the lamps 32 when light no longer impinges on the light detector 12.

While the invention has been described in complete detail and pictorially shown in the accompanying drawings, it is not to be limited to such details, since many changes and modifications may be made to the invention without departing from the spirit and the scope thereof. For example, the light detector 12 may be an ultrasonic or an infra-red detector, the detector 12 or a further detector may be located in front of the vehicle to detect the presence of oncoming vehicles. Alternatively, the safety device 10 may be configured to operate a separate set of warning lights other than the rear lamps 32 of the motor vehicle 30. Hence, it is described to cover any and all modifications and forms which may come within the language and scope of the claims.

We claim:

1. A safety device for a vehicle comprising:
   a) at least one warning lamp mountable on the vehicle,
   b) a detector located rearwardly on the vehicle for detecting the presence of a rearwardly approaching vehicle,
   c) activating means for activating the warning lamp for a predetermined period of time when the presence of the rearwardly approaching vehicle is detected by the detector,
   d) interlocking means for preventing reactivation of the warning lamp when light is continuously present at the light detector for a period exceeding the predetermined period of the warning lamp, and
   e) a power source which is supplied to the detector and to the activating means when the headlamps of the vehicle are turned on.

2. The safety device for a vehicle as specified in claim 1 wherein the warning lamp flashes at a predetermined frequency during the predetermined period.

3. The safety device for a vehicle as specified in claim 2 wherein the detector is a light detector for detecting light from the headlamps of the approaching vehicle.

4. The safety device for a vehicle as specified in claim 2 wherein the detector is a light detector for detecting light from the headlamps of the approaching vehicle.

5. The safety device for a vehicle as specified in claim 3 wherein the light detector comprises a light-dependent resistor.

6. The safety device for a vehicle as specified in claim 4 wherein the detector is rearwardly locatable on the vehicle to detect vehicles approaching from the rear.

7. The safety device for a vehicle as specified in claim 3 further comprising an interlocking means for preventing reactivation of the warning lap when light is continuously present at the light detector for a period exceeding the predetermined period of the warning lamp.

8. The safety device for a vehicle as specified in claim 3 further comprising an interlocking means for preventing reactivation of the warning lamp when light is continuously present at the light detector for a period exceeding the predetermined period of the warning lamp.

9. The safety device for a vehicle as specified in claim 3 further comprising an interlocking means for preventing reactivation of the warning lamp when light is continuously present at the light detector for a period exceeding the predetermined period of the warning lamp.

10. The safety device for a vehicle as specified in claim 7 wherein the warning lamp is reactivatable only after the light is no longer present at the detector.

11. The safety device for a vehicle as specified in claim 2 wherein the warning lamp comprises a hazard lamp on the vehicle.

12. The safety device for a vehicle as specified in claim 2 further comprising an annunciator means in the interior of the vehicle to warn occupants of the vehicle of the presence of the approaching vehicle.

13. The safety device for a vehicle as specified in claim 12 wherein the annunciator means comprises a visible annunciator means.

14. The safety device for a vehicle as specified in claim 13 wherein the visible annunciator means comprises an indicator lamp located in the interior of the vehicle.

* * * * *